(12) United States Patent
Gras et al.

(10) Patent No.: US 10,076,008 B2
(45) Date of Patent: *Sep. 11, 2018

(54) OPTOELECTRONIC CIRCUIT COMPRISING LIGHT-EMITTING DIODES

(71) Applicant: EASII IC, Grenoble (FR)

(72) Inventors: David Gras, Echirolles (FR); Olivier Valorge, Paris (FR)

(73) Assignee: EASII IC, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,301

(22) Filed: Mar. 24, 2017

(65) Prior Publication Data

US 2017/0280526 A1    Sep. 28, 2017

(30) Foreign Application Priority Data

Mar. 24, 2016   (FR) ...................................... 16 57849

(51) Int. Cl.
*H05B 37/02*    (2006.01)
*H05B 33/08*    (2006.01)

(52) U.S. Cl.
CPC ....... *H05B 33/0845* (2013.01); *H05B 33/083* (2013.01); *H05B 33/0815* (2013.01)

(58) Field of Classification Search
CPC ............ H05B 33/0815; H05B 33/0818; H05B 33/0833; H05B 33/0842; H05B 33/0845
USPC .................................................... 315/185 R
See application file for complete search history.

(56) References Cited

U.S. PATENT DOCUMENTS

| 9,723,674 | B2* | 8/2017 | Nozawa | H05B 33/0842 |
| 2010/0231135 | A1* | 9/2010 | Hum | H05B 33/0815 315/250 |
| 2013/0026924 | A1* | 1/2013 | Jong | H05B 33/0818 315/113 |
| 2013/0307415 | A1 | 11/2013 | Ni | |
| 2013/0313984 | A1 | 11/2013 | Maiwald | |
| 2014/0125235 | A1* | 5/2014 | van den Berg | H05B 33/0809 315/185 R |
| 2017/0099708 | A1* | 4/2017 | Lynch | H02M 1/14 |
| 2017/0156186 | A1* | 6/2017 | Grajcar | H05B 33/0845 |

OTHER PUBLICATIONS

Preliminary Search Report in French Patent Application No. 1657849 dated Feb. 6, 2017, 2 pages.

* cited by examiner

*Primary Examiner* — Tung X Le
(74) *Attorney, Agent, or Firm* — Moreno IP Law LLC

(57) ABSTRACT

The invention relates to an optoelectronic circuit intended to receive, between a first node and a second node, a variable voltage, the optoelectronic circuit including: a plurality of light-emitting diodes series-assembled between the first node and a third node; a first current limitation/regulation circuit assembled between the third node and the second node; a switching circuit coupling the third node to at least certain light-emitting diodes of the plurality of light-emitting diodes; a capacitor including first and second plates; a first diode having its cathode connected to the second plate and having its anode coupled to the second node; and a second diode having its anode connected to the second plate and having its cathode coupled to the third node or to a second current limitation/regulation circuit.

9 Claims, 9 Drawing Sheets

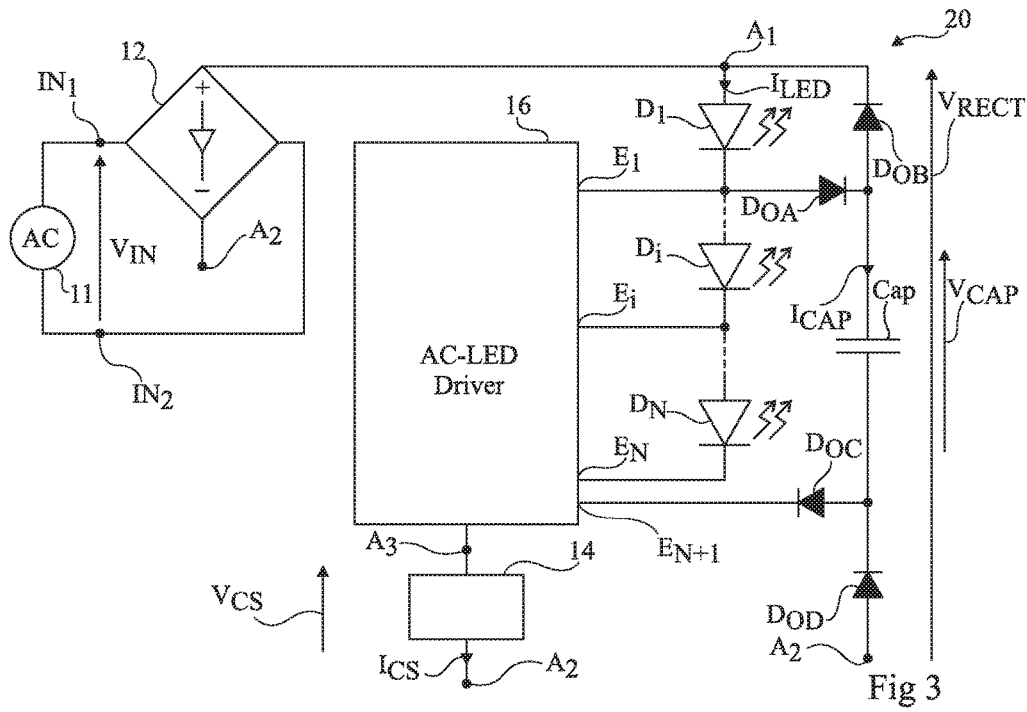
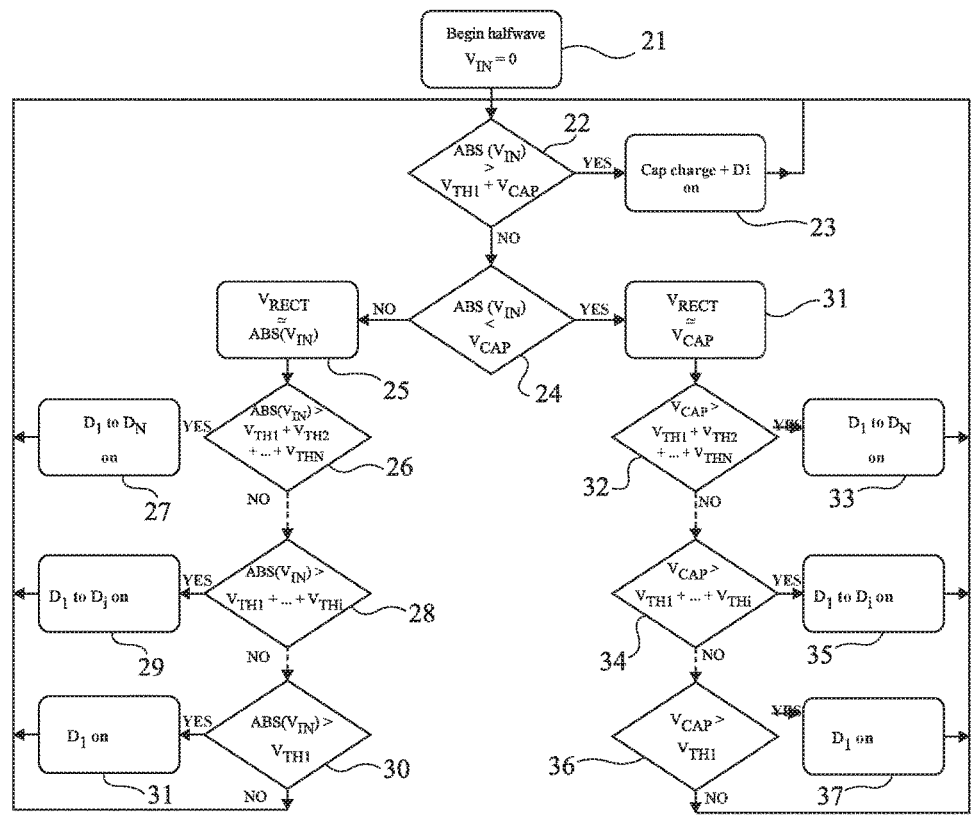

though the voltage applied to the assembly of light-emitting diodes is smaller than the sum of the threshold voltages of the light-emitting diodes. An observer may perceive this lack of light emission when the duration of each phase with no light emission between two light-emission phases is too long.

OPTOELECTRONIC CIRCUIT COMPRISING LIGHT-EMITTING DIODES

BACKGROUND

The present description relates to an optoelectronic circuit, particularly to an optoelectronic circuit comprising light-emitting diodes.

DISCUSSION OF THE RELATED ART

It is desirable to be able to power an optoelectronic circuit comprising light-emitting diodes with a variable AC voltage, particularly a sinusoidal voltage, for example, the mains voltage. The optoelectronic circuit may comprise series-assembled light-emitting diodes. The voltage applied to the assembly of light-emitting diodes should then be greater than the sum of the threshold voltages of the light-emitting diodes in order for the latter to emit light. In operation, the optoelectronic circuit may thus have phases with no light emission between two light-emission phases when the voltage applied to the assembly of light-emitting diodes is smaller than the sum of the threshold voltages of the light-emitting diodes. An observer may perceive this lack of light emission when the duration of each phase with no light emission between two light-emission phases is too long.

To decrease the duration of phases with no light emission, it is known to use a circuit for switching the light-emitting diodes in order to decrease the number of series-connected light-emitting diodes when the voltage applied to the light-emitting diodes decreases. However, this does not enable to fully suppress phases with no light emission.

SUMMARY

An object of an embodiment is to overcome all or part of the disadvantages of the previously-described optoelectronic circuits.

Another object of an embodiment is to further decrease the duration of phases with no light emission by the optoelectronic circuit, or to suppress phases with no light emission by the optoelectronic circuit even in the case where a dimmer is used.

Another object of an embodiment is for the current powering the light-emitting diodes to vary substantially continuously.

Thus, an embodiment provides an optoelectronic circuit intended to receive, between a first node and a second node, a variable voltage containing an alternation of rising positive phases and of falling positive phases, the optoelectronic circuit comprising:

a plurality of light-emitting diodes series-assembled between the first node and a third node;

a first current limitation/regulation circuit assembled between the third node and the second node;

a switching circuit coupling the third node to at least certain light-emitting diodes of the plurality of light-emitting diodes;

a capacitor comprising first and second plates;

a first diode having its cathode connected to the second plate and having its anode coupled to the second node;

a second diode having its anode connected to the second plate and having its cathode coupled to the third node or to a second current limitation/regulation circuit;

when the cathode of the second diode is coupled to the third node, a third diode having its anode connected to one of the light-emitting diodes and having its cathode connected to the first plate; and when the cathode of the second diode is coupled to the third node, a fourth diode having its anode connected to the first plate and having its cathode coupled to the first node.

According to an embodiment, the plurality of series-connected light-emitting diodes comprises a first light-emitting diode having its anode connected to the first node, the anode of the third diode being connected to the cathode of the first light-emitting diode.

According to an embodiment, the switching circuit comprises, for each light-emitting diode from among at least certain light-emitting diodes of the plurality of light-emitting diodes, a current conduction circuit coupling the third node to the cathode of the light-emitting diode and capable of taking at least first and second states, the conduction circuit in the first state being less electrically conductive than in the second state.

According to an embodiment, the switching circuit further comprises a current conduction circuit coupling the third node to the cathode of the second diode.

According to an embodiment, the first current limitation/regulation circuit comprises a first current source capable of supplying a current having its intensity depending on a set point.

According to an embodiment, the optoelectronic circuit comprises a first circuit capable of receiving said variable voltage and of supplying a pulse-width modulated binary signal.

According to an embodiment, the optoelectronic circuit comprises a modulation and filtering circuit capable of receiving the binary signal and of supplying the set point, which has its average value depending on the duty cycle of the binary signal.

According to an embodiment, the optoelectronic circuit further comprises a device for decreasing the impedance seen between the first node and the second node.

According to an embodiment, the impedance decrease device comprises a third current limitation/regulation circuit and a transistor in series with the third current limitation/regulation circuit.

According to an embodiment, the impedance decrease device comprises a unit capable of controlling the transistor from the voltage across the third current limitation/regulation circuit.

BRIEF DESCRIPTION OF THE DRAWINGS

The foregoing and other features and advantages will be discussed in detail in the following non-limiting description of specific embodiments in connection with the accompanying drawings, among which:

FIG. 3 shows an electric diagram of an embodiment of an optoelectronic circuit comprising light-emitting diodes;

FIG. 4 shows a flowchart of the operation of the optoelectronic circuit shown in FIG. 3;

DETAILED DESCRIPTION OF THE PRESENT EMBODIMENTS

Figure 1:
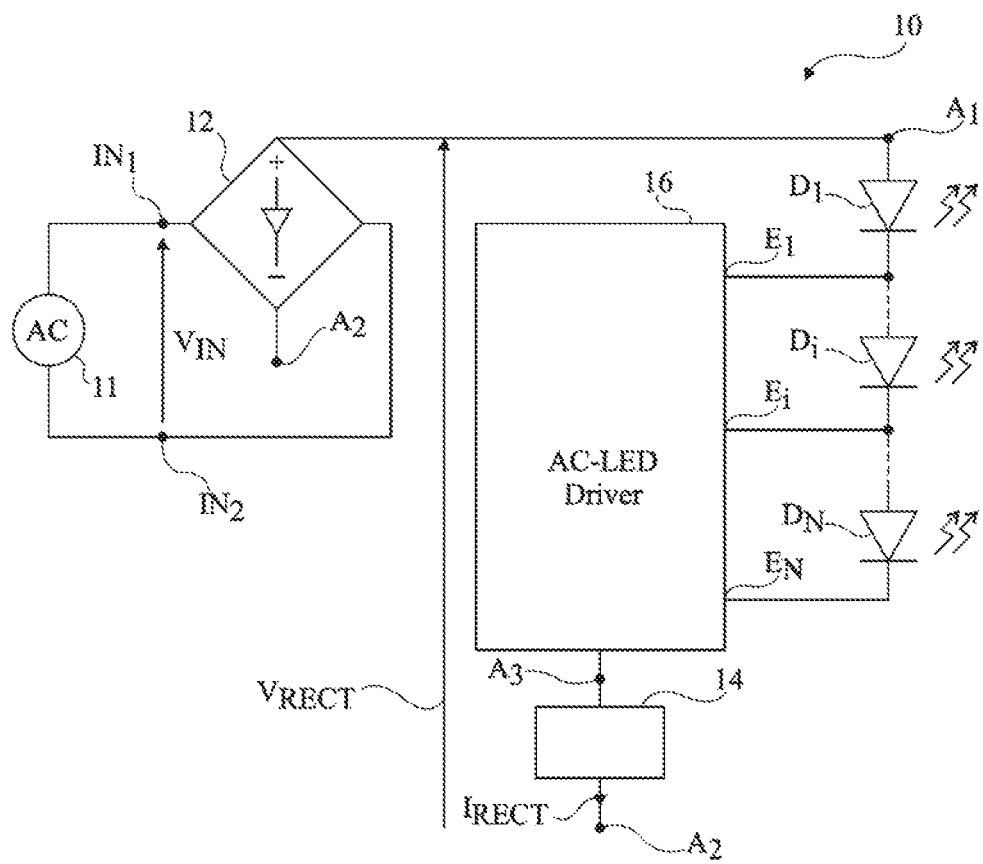
FIG. 1 is an electric diagram of an example of an optoelectronic circuit comprising light-emitting diodes.

For clarity, the same elements have been designated with the same reference numerals in the various drawings and, further, the various drawings are not to scale. Unless otherwise specified, expressions "approximately", "substantially", and "in the order of" mean to within 10%, preferably to within 5%. Further, a signal which alternates between a first constant state, for example, a low state, noted "0", and a second constant state, for example, a high state, noted "1", is called "binary signal". The high and low states of different binary signals of a same electronic circuit may be different. In particular, the binary signals may correspond to voltages or to currents which may not be perfectly constant in the high or low state. Further, in the present description, term "connected" is used to designate a direct electric connection, with no intermediate electronic component, for example, by means of a conductive track, and term "coupled" or term "linked" will be used to designate either a direct electric connection (then meaning "connected") or a connection via one or a plurality of intermediate components (resistor, capacitor, etc.).

FIG. 1 shows an example of an optoelectronic circuit 10 comprising input terminals $IN_1$ and $IN_2$ having an AC voltage $V_{IN}$ supplied by a source of an AC voltage 11 applied therebetween. As an example, AC voltage $V_{IN}$ of the mains is considered in the following description. Optoelectronic circuit 10 further comprises a rectifying circuit 12 comprising a diode bridge, receiving voltage $V_{IN}$ and supplying a rectified voltage $V_{RECT}$ between nodes $A_1$ and $A_2$. As a variation, circuit 10 may directly receive a rectified voltage, and it is then possible for rectifying circuit 12 not to be present. The potential at node $A_2$ may correspond to a low reference potential, for example, 0 V, having the voltages of optoelectronic circuit 10 referenced thereto. In the following description, $V_{ABS}$ designates the voltage which is supplied by rectifying circuit 12. Voltages $V_{ABS}$ is thus substantially equal to the absolute value of AC voltage $V_{IN}$.

Optoelectronic circuit 10 comprises N series assemblies of elementary light-emitting diodes, called general light-emitting diodes $D_i$ in the following description, where i is an integer in the range from 1 to N and where N is an integer in the range from 2 to 200. Call $V_{TH i}$ the threshold voltage of light-emitting diode $D_i$. Each general light-emitting diode $D_1$ to $D_N$ comprises at least one elementary light-emitting diode. Each general light-emitting diode may be formed of the series and/or parallel assembly of at least two elementary light-emitting diodes. In the present example, the N general light-emitting diodes $D_i$ are series-connected, the cathode of general light-emitting diode $D_i$ being coupled to the anode of general light-emitting diode $D_{i+1}$, for i varying from 1 to N−1. The anode of general light-emitting diode $D_1$ is coupled to node $A_1$. General light-emitting diodes $D_i$, with i varying from 1 to N, may comprise the same number of elementary light-emitting diodes or different numbers of elementary light-emitting diodes.

Circuit 10 comprises a current regulation/limitation circuit 14, assembled between node $A_2$ and a node $A_3$. Call $V_{CS}$ the voltage across circuit 14 and $I_{CS}$ the current flowing between nodes $A_3$ and $A_2$. Circuit 14 for example corresponds to a resistor or to a current source. Circuit 14 is capable of limiting and/or of regulating current $I_{CS}$.

Circuit 10 comprises a circuit 16 (AC-LED Driver) for switching general light-emitting diodes $D_i$, with i varying from 1 to N, capable of short-circuit a variable number of general light-emitting diodes according to the variation of voltage $V_{RECT}$. Document US 2012/0056559 describes an example of a switching circuit. As an example, switching circuit 16 is coupled to node $A_3$ and comprises N inputs $E_i$, with i varying from 1 to N, each input $E_i$ being connected to the cathode of general light-emitting diode $D_i$. As a variation, current regulation/limitation circuit 14 may belong to switching circuit 16. As an example, switching circuit 16 comprises, for each input $E_i$, a conduction circuit, not shown, coupling input $E_i$ to node $A_3$. Each conduction circuit may operate in K different conduction states, where K is an integer greater than or equal to 2. A conduction state is a state where the circuit conducts no current or conducts current with a resistance which may be different according to the considered state. The number of general light-emitting diodes emitting light can thus progressively increase during a phase of growth of voltage $V_{RECT}$ and progressively decreases during a phase of decrease of voltage $V_{RECT}$. As a variation, number M of inputs $E_i$ may be smaller than N and it is possible for the cathodes of some of the general light-emitting diodes $D_i$ not to be connected to switching circuit 16.

Optoelectronic circuit 10 may comprise a circuit, not shown, which supplies a reference voltage for the supply of limitation/regulation circuit 14, possibly obtained from voltage $V_{RECT}$. When circuit 14 corresponds to a current source, it may be continuously controlled by a circuit external to optoelectronic circuit 10.

Figure 2:
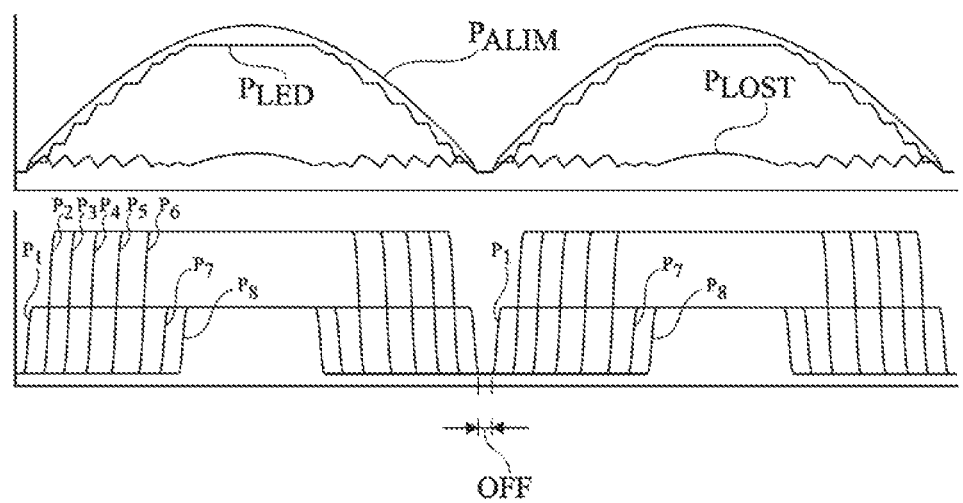
FIG. 2 is a timing diagram of electric powers of the optoelectronic circuit of FIG. 1.

FIG. 2 shows timing diagrams, obtained by simulation for an optoelectronic circuit 10 having the structure shown in FIG. 1 and comprising 8 general light-emitting diodes $D_1$ to $D_8$, of the electric power $P_{ALIM}$ supplied by rectifying circuit 12, of the electric power $P_{LED}$ used by general light-emitting diodes $D_1$ to $D_8$, of the electric power $P_{LOST}$ which is not consumed by general light-emitting diodes $D_1$ to $D_8$, and of the electric powers $P_1$ to $P_8$ respectively consumed by general light-emitting diode $D_1$ to $D_8$ in the case where AC voltage $V_{IN}$ corresponds to a sinusoidal voltage. As shown in FIG. 2, general light-emitting diodes $D_1$ to $D_8$ becomes successively conductive during each rising phase of voltage $V_{RECT}$ and progressively turn off during each falling phase of voltage $V_{RECT}$.

This enables to decrease the duration of each phase with no light emission (OFF phase in FIG. 2). However, such phases with no light emission cannot be totally suppressed. An observer may perceive this lack of light emission when the duration of each phase with no light emission between two light-emission phases is too long. It would thus be desirable to further decrease, or even to totally suppress phases with no light emission.

FIG. 3 shows an embodiment of an optoelectronic circuit 20 enabling to further decrease, or even to totally suppress phases with no light emission. Optoelectronic circuit 20 comprises all the elements of optoelectronic circuit 10 shown in FIG. 1 and further comprises a capacitor Cap and four diodes $D_{0A}$, $D_{0B}$, $D_{0C}$, and $D_{0D}$. In the present embodiment, the anode of diode $D_{0A}$ is connected to the cathode of general light-emitting diode $D_1$ and the cathode of diode $D_{0A}$ is connected to a first plate of capacitor Cap. The cathode of diode $D_{0B}$ is connected to node $A_1$ and the anode of diode $D_{0B}$ is connected to the first plate of capacitor Cap. The cathode of diode $D_{0C}$ is connected to an input $E_{N+1}$ of switching circuit 16 and the anode of diode $D_{0C}$ is connected to a second plate of capacitor Cap. The anode of diode $D_{0D}$ is connected to node $A_2$ and the cathode of diode $D_{0D}$ is connected to the second plate of capacitor Cap. Voltage $V_{CAP}$ is the voltage between the first plate and the second plate of capacitor Cap and current $I_{CAP}$ is the current flowing through capacitor Cap. Switching circuit 16 comprises a conduction circuit, not shown, coupling input $E_{N+1}$ to node $A_3$ and capable of operating in K different conduction states, where K is an integer greater than or equal to 2. As a variation, node $E_{N+1}$ is directly connected to node $A_3$. $V_{THD0A}$, $V_{THD0B}$, $V_{THD0C}$, and $V_{THD0D}$ respectively designate the threshold voltages, respectively, of diodes $D_{0A}$, $D_{0B}$, $D_{0C}$, and $D_{0D}$.

As an example, the capacitance of capacitor Cap is in the range from 100 nF to 100 µF. The threshold voltage of diodes $D_{0A}$, $D_{0B}$, $D_{0C}$, and $D_{0D}$ is, for example, in the order of one volt, for example, 0.7 V.

FIG. 4 shows a flowchart of the operation of optoelectronic circuit 20 shown in FIG. 3. The operation starts at block 21, which corresponds to the beginning of a variation cycle of voltage $V_{IN}$ when voltage $V_{IN}$ is equal to 0 V.

In operation, when the absolute value of voltage $V_{IN}$ is greater than the sum of voltages $V_{CAP}$ and $V_{TH1}$ (test 22), general light-emitting diode $D_1$ is conductive and capacitor Cap is charged (block 23) by the current flowing through nodes $A_1$ and $A_3$ successively running through general light-emitting diode $D_1$, diode $D_{0A}$, capacitor Cap, and diode $D_{0C}$.

In operation, when the absolute value of voltage $V_{IN}$ is between the sum of voltages $V_{CAP}$, $V_{THD0A}$ and $V_{THD0C}$ and the sum of voltages $V_{CAP}$, $V_{THD0A}$ and $V_{THD0C}$ and $V_{TH1}$ (tests 22 and 24), the value of rectified voltage $V_{RECT}$ is imposed by the power supply source of optoelectronic circuit 20 and is equal to the absolute value of voltage $V_{IN}$ minus the threshold voltages of the diodes of rectifying bridge 12 (block 25). The number of general light-emitting diodes which can emit light then depends on the absolute value of voltage $V_{IN}$. If the absolute value of $V_{IN}$ is greater than the sum of threshold voltages $V_{TH1}$ to $V_{THN}$ (test 26), general light-emitting diodes $D_1$ to $D_N$ can emit light (block 27). Generally, if the absolute value of voltage $V_{IN}$ is greater than the sum of threshold voltages $V_{TH1}$ to $V_{THi}$ but smaller than the sum of threshold voltages $V_{TH1}$ to $V_{THi+1}$ (tests 26 and 28), only general light-emitting diodes $D_1$ to $D_i$ can emit light (block 29). Further, if the absolute value of voltage $V_{IN}$ is only greater than threshold voltage $V_{TH1}$ (test 30), only light-emitting diode $D_1$ can emit light (block 31). The selection of the number of general light-emitting diodes which will effectively emit light among the general light emitting diodes which can emit light is carried out by switching circuit 16. According to an embodiment, switching circuit 16 selects the largest number of general light-emitting diodes which can emit light.

In operation, when the absolute value of voltage $V_{IN}$ is smaller than voltage $V_{CAP}$ minus the sum of voltages $V_{THD0B}$ and $V_{THD0D}$ (test 24), rectified voltage $V_{RECT}$ is imposed by capacitor Cap and is equal to voltage $V_{CAP}$ minus the voltages across diodes $D_{0B}$ and $D_{0D}$ (block 31). The current then flows by successively running through diode $D_{0B}$, one or a plurality of general light-emitting diodes, circuit 14, diode $D_{0D}$, and capacitor Cap. The number of light-emitting diodes which can emit light depends on the value of voltage $V_{CAP}$ minus the sum of voltages $V_{THD0B}$ and $V_{THD0D}$. If voltage $V_{CAP}$ minus the sum of voltages $V_{THD0B}$ and $V_{THD0D}$ is greater than the sum of threshold voltages $V_{TH1}$ to $V_{THN}$ (test 32), light-emitting diodes $D_1$ to $D_N$ can emit light (block 33). Generally, if voltage $V_{CAP}$ minus the sum of voltages $V_{THD0B}$ and $V_{THD0D}$ is greater than the sum of threshold voltages $V_{TH1}$ to $V_{TH1}$ but smaller than the sum of threshold voltages $V_{TH1}$ to $V_{THi+1}$ (test 34), only light-emitting diodes $D_1$ to $D_i$ can emit light (block 35). Further, if voltage $V_{CAP}$ minus the sum of voltages $V_{THD0B}$ and $V_{THD0D}$ is only greater than threshold voltage $V_{TH1}$ (test 36), only light-emitting diode $D_1$ can emit light (block 37). The selection of the number of general light-emitting diodes which will effectively emit light among the general light emitting diodes which can emit light is carried out by switching circuit 16. According to an embodiment, switching circuit 16 selects the largest number of general light-emitting diodes which can emit light, knowing that the charge of capacitor Cap remains the priority.

The present embodiment enables to limit the phase shift between the current supplied by source 11 of AC voltage $V_{IN}$ and voltage $V_{IN}$, and thus to keep a significant power factor conversely to an embodiment where capacitor Cap would be directly provided between nodes $A_1$ and $A_2$, which would shift the phase of the current supplied by source 11 of AC voltage $V_{IN}$ and voltage V.

In the case where N is greater than or equal to 2, the fact for the optoelectronic circuit to comprise general light-emitting diodes $D_2$ to $D_N$ in series after general light-emitting diode $D_1$ enables to increase the light emitting efficiency of the optoelectronic circuit. Indeed, on the leading edge of $V_{ABS}$, between the time when general light-emitting diode $D_1$ is powered by the mains and the time when capacitor Cap starts being charged, the electric power would be lost in the absence of general light-emitting diodes $D_2$ to $D_N$. Similarly, electric power would be lost on the trailing edge of $V_{ABS}$, between the time when the charge of capacitor Cap has been completed and the time when capacitor Cap discharges into general light-emitting diode $D_1$ in the absence of general light-emitting diodes $D_2$ to $D_N$.

The operation of optoelectronic circuit 20 comprises an initialization phase during which voltage $V_{CAP}$ increases during successive variation cycles of voltage $V_{RECT}$ until it settles at an average value for which the charge and the discharge of capacitor Cap are equivalent.

The general operating principle of previously-described optoelectronic circuit 20 shown in FIG. 3 will now be described in specific embodiments. In the embodiments which will be described hereafter, $I_{LED}$ designates the current flowing through general light-emitting diode $D_1$ and $I_{CAP}$ designates the current flowing through capacitor Cap.

Figure 5:
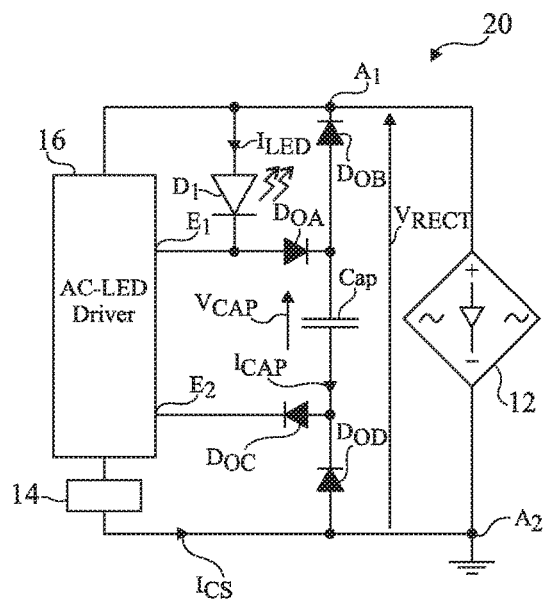
FIG. 5 is a drawing similar to FIG. 3 in a specific case and FIG. 6 is a timing diagram of currents and of voltages of the optoelectronic circuit of FIG. 5.
Figure 6:
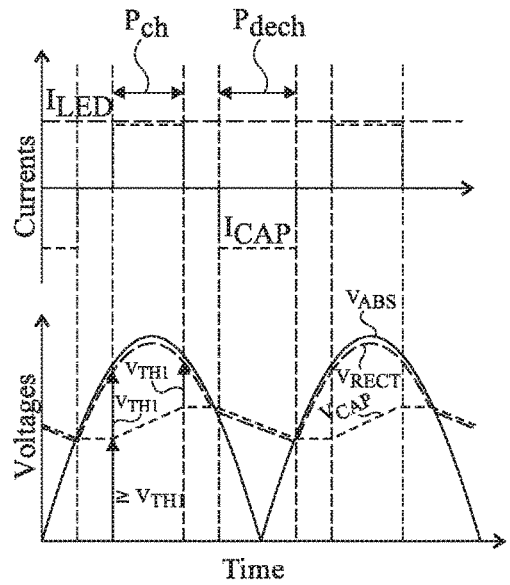

FIG. 5 is a drawing similar to FIG. 3 in the case where N is equal to 1 and FIG. 6 is a timing diagram of currents $I_{CAP}$ and $I_{LED}$ and of voltages $V_{ABS}$, $V_{RECT}$, and $V_{CAP}$ of the optoelectronic circuit of FIG. 5. In FIG. 5, terminals $IN_1$ and $IN_2$ and source 11 are not shown. In FIG. 6, the threshold voltages of diodes $D_{OA}$, $D_{OB}$, $D_{OC}$, and $D_{OD}$ are neglected. Each phase $P_{ch}$ corresponds to a phase of charge of capacitor Cap and each phase $P_{dech}$ corresponds to a phase of discharge of capacitor Cap.

Figure 7:
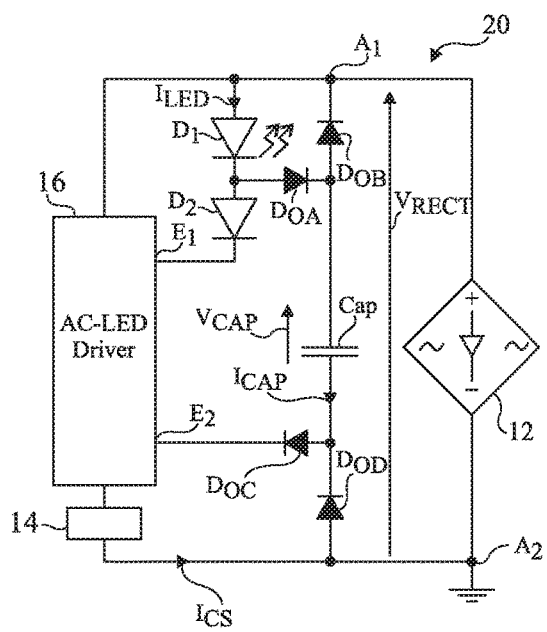
FIG. 7 is a drawing similar to FIG. 3 in another specific case and FIG. 8 is a timing diagram of currents and of voltages of the optoelectronic circuit of FIG. 7.
Figure 8:
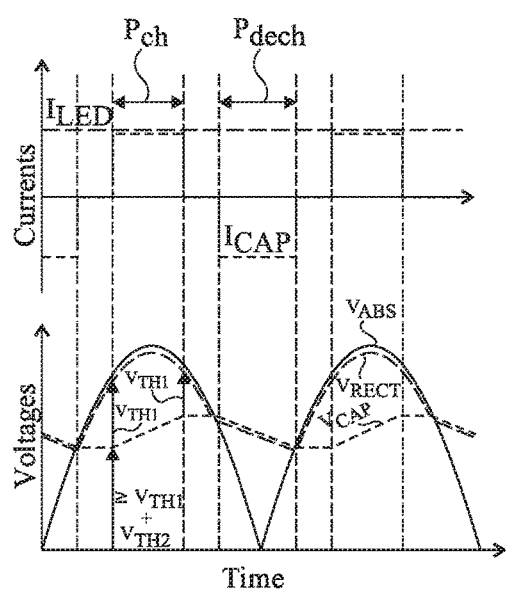

FIGS. 7 and 8 are drawings respectively similar to FIGS. 5 and 6 in the case where number N of general light-emitting diodes is equal to 2 and in the case where only the cathode of general light-emitting diode $D_2$ is connected to switching circuit 16.

Figure 9:
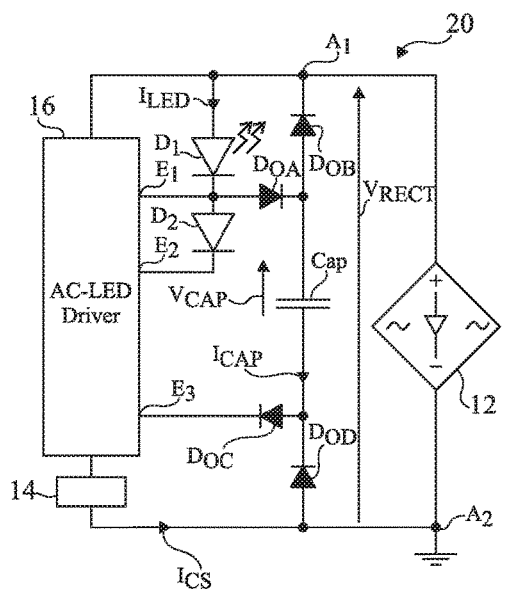
FIG. 9 is a drawing similar to FIG. 3 in another specific case and FIG. 10 is a timing diagram of currents and of voltages of the optoelectronic circuit of FIG. 9.
Figure 10:
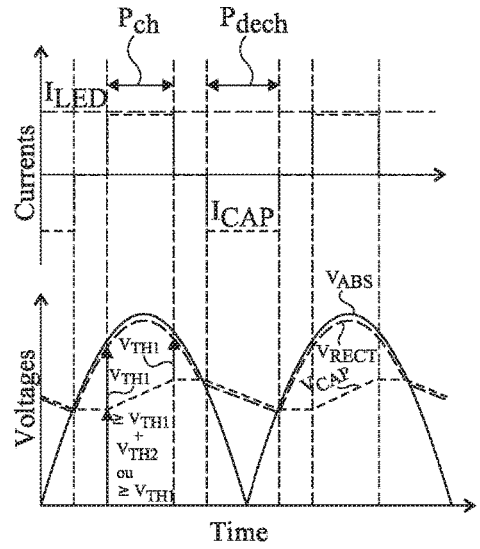

FIGS. 9 and 10 are drawings respectively similar to FIGS. 5 and 6 in the case where number N of general light-emitting diodes is equal to 2 and in the case where the cathodes of general light-emitting diodes $D_1$ and $D_2$ are connected to switching circuit 16.

The fact for diode $D_{OA}$ to be connected to the cathode of general light-emitting diode $D_1$ and for diode $D_{OC}$ to be connected to node $E_{N+1}$ enables to apply to capacitor Cap a maximum charge voltage which is the closest possible to $V_{RECT}$ minus the threshold voltage of general light-emitting diode $D_1$ and the threshold voltages of diodes $D_{OA}$ and $D_{OC}$ only and dependent on the current imposed by current regulation/limitation circuit 14.

According to another embodiment, the charge and discharge currents of capacitor Cap are different, to modify the charge and discharge times of capacitor Cap and thus to optimize the electrical efficiency and/or the flicker performance of optoelectronic circuit 20.

Figure 11:
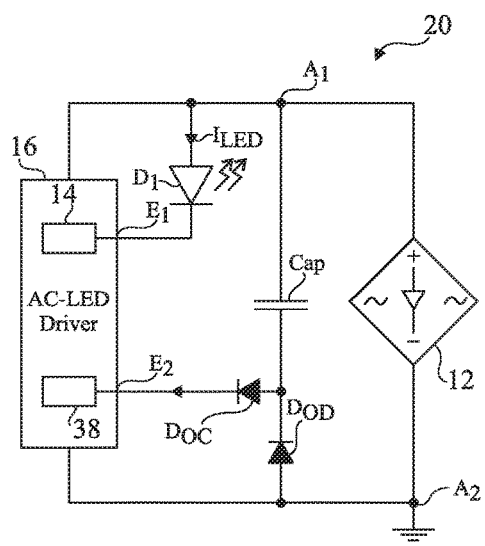
FIGS. 11, 12, and 13 show electric diagrams of other embodiments of an optoelectronic circuit comprising light-emitting diodes.

FIG. 11 is a drawing similar to FIG. 5, with the difference that diodes $D_{OA}$ and $D_{OB}$ are not present, that switching circuit 16 comprises the current source 14 which is coupled to general light-emitting diode $D_1$, and that switching circuit 16 further comprises an additional current source 38 connected to the cathode of diode $D_{OC}$. This embodiment advantageously enables for the charge current of capacitor Cap to be different from the discharge current of capacitor Cap.

Figure 12:
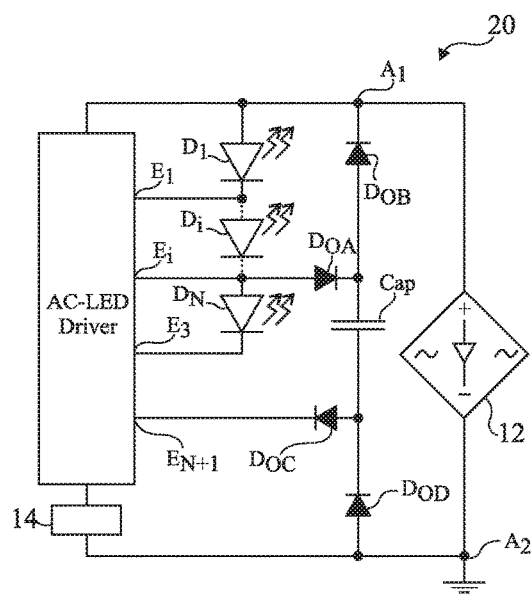

FIG. 12 is a drawing similar to FIG. 3, with the difference that the anode of diode $D_{OA}$ is connected to the cathode of general light-emitting diode $D_i$. This may be advantageous in the case where voltage $V_{RECT}$ does not correspond to a rectified sinusoidal voltage but corresponds, for example, to the voltage supplied by a dimmer, particularly a leading edge dimmer and a trailing edge dimmer. In this case, the voltage across capacitor Cap is lower. Capacitor Cap is likely to no longer be able to discharge into the first group of light-emitting diodes. Dividing this first group into a plurality of groups with lower threshold voltages enables the device to remain on, even for a low value $V_{CAP}$.

Figure 13:
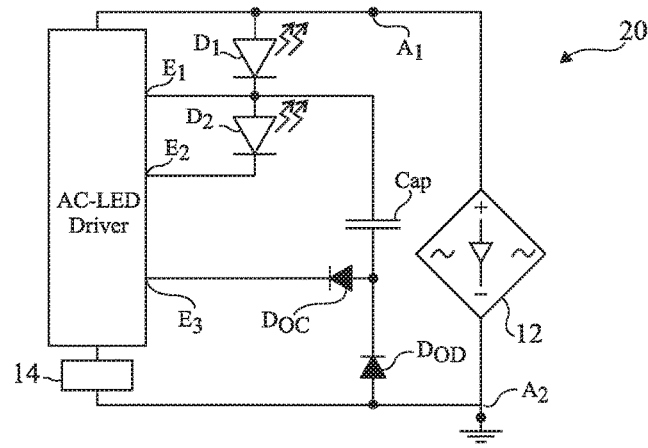

FIG. 13 is a drawing similar to FIG. 9, with the difference that diodes $D_{OA}$ and $D_{OB}$ are not present and that the electrode of capacitor Cap which, in FIG. 9, is connected to the cathode of diode $D_{OA}$ and to the anode of diode DOB, is in FIG. 13 connected to the cathode of general light-emitting diode $D_1$. This embodiment advantageously enables to have two diodes less than in the embodiment shown in FIG. 1.

Figure 14:
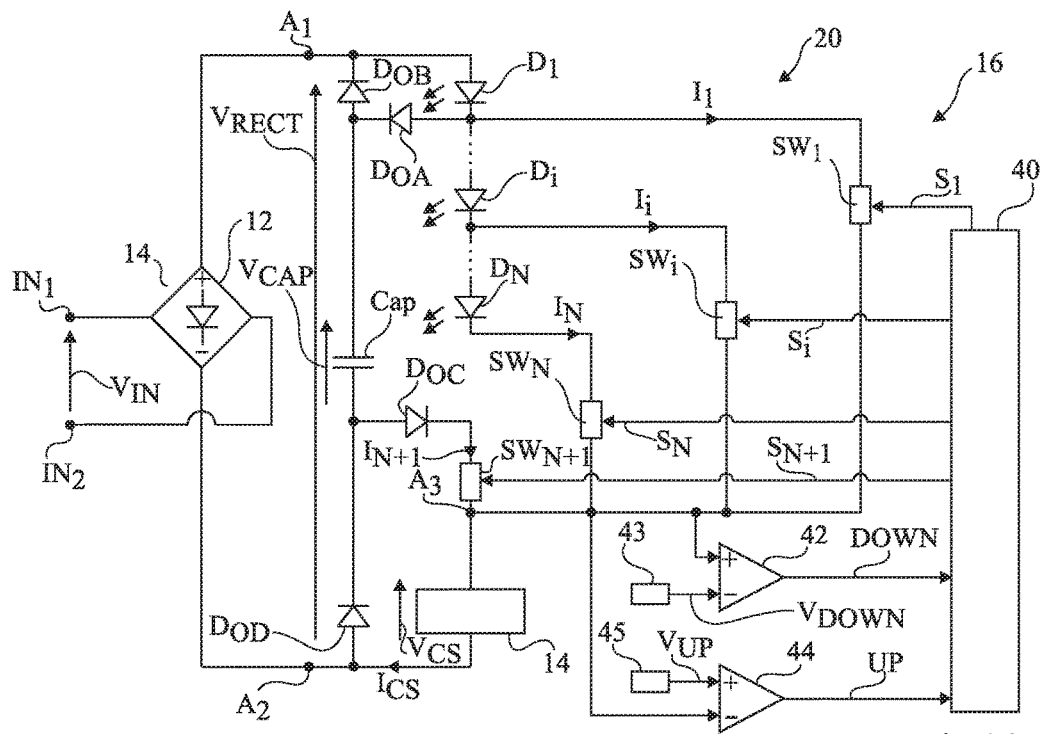
FIG. 14 shows an electric diagram of a more detailed embodiment of the optoelectronic circuit shown in FIG. 3.

FIG. 14 shows a more detailed embodiment of certain embodiments of optoelectronic circuit 20 shown in FIG. 3 and which is described in still unpublished French patent application FR 15/59617.

In this embodiment, switching circuit 16 comprises N+1 conduction circuits $SW_1$ to $SW_{N+1}$. Each conduction circuit $SW_i$, with i varying from 1 to N, is assembled between node $A_3$ and the cathode of general light-emitting diode $D_i$. Conduction circuit $SW_{N+1}$ is assembled between node $A_3$ and the cathode of diode $D_{OC}$.

Each circuit $SW_i$, with i varying from 1 to N+1, is controlled by a signal $S_i$ supplied by a control unit 40. For i varying from 1 to N+1, $I_i$ designates the current flowing through circuit $SW_i$. As a variation, it is possible for circuit $SW_{N+1}$, which protects current source 30 against overvoltages, not to be controlled by the control unit and to still be on or to be absent, and for the cathode of diode $D_{OC}$ to be directly connected to node $A_3$. Control unit 16 may be totally or partly formed by a dedicated circuit or may comprise a microprocessor or a microcontroller capable of executing a sequence of instructions stored in a memory.

According to an embodiment, each circuit $SW_i$ may operate in K different conduction states, where K is an integer greater than or equal to 2. A conduction state is a state where the circuit conducts no current or conducts current with a resistance which may be different according to the considered state. Among the K conduction states of circuit $SW_i$, there is a state where circuit $SW_i$ is the least electrically conductive, for example, a state where no current can flow through circuit $SW_i$, and a state when circuit $SW_i$ is the most electrically conductive. When K is equal to 2, circuit $SW_i$ is, for example, a switch which is either off or on. Signal $S_i$ may then be a binary signal and switch $SW_i$ is off when signal $S_i$ is at a first level, for example, $S_{i,1}$ or "0", and switch $SW_i$ is on when signal $S_i$ is at a second level, for example, $S_{i,2}$ or "1". As an example, when K is greater than or equal to 3, circuit $SW_i$ may operate in a state where no current can flow therethrough and in at least two states where circuit $SW_i$ enables current to flow with different resistances according to signal $S_i$. Signal $S_i$ may then be a signal capable of taking a plurality of discrete values $S_{i,1}$ to $S_{i,K}$, each value of signal $S_i$ controlling one of the states of switch $SW_i$. As an example, the state of circuit $SW_i$ associated with signal $S_{i,1}$ corresponds to the off state where no current can flow through circuit $SW_i$ and the states of circuit $SW_i$ respectively associated with signals $S_{i,2}$ to $S_{i,K}$ correspond to the states where circuit $SW_i$ has a lower and lower resistance. As a variation, different values of signal $S_i$ may control a same conduction state of circuit $SW_i$.

Optoelectronic circuit 20 comprises a first comparator 42, for example, an operational amplifier assembled as a comparator, supplying a signal DOWN to control unit 40, having its non-inverting input (+) coupled to node $A_3$ and having its inverting input (−) receiving a voltage threshold $V_{DOWN}$ supplied by a circuit 43. According to an embodiment, comparator 42 supplies dual-state signal DOWN. Signal DOWN is set to the first state, for example, "0", when voltage $V_{CS}$ is smaller than voltage threshold $V_{DOWN}$. Signal DOWN is set to the second state, for example, "1", when voltage $V_{CS}$ is greater than voltage threshold $V_{DOWN}$.

Optoelectronic circuit 20 comprises a second comparator 44, for example, an operational amplifier assembled as a comparator, supplying a signal UP to control unit 40, having its inverting input (−) coupled to node $A_3$ and having its non-inverting input (+) receiving a voltage threshold $V_{UP}$ supplied by a circuit 45. According to an embodiment, comparator 44 supplies dual-state signal UP. Signal UP is set to the first state, for example, "0", when voltage $V_{CS}$ is greater than voltage threshold $V_{UP}$. Signal UP is set to the second state, for example, "1", when voltage $V_{CS}$ is smaller than voltage threshold $V_{UP}$, voltage $V_{UP}$ being smaller than voltage $V_{DOWN}$.

According to an embodiment, each $SW_i$ is, for example, made of at least one transistor, particularly, an enrichment or depletion metal-oxide gate field-effect transistor or MOS transistor.

According to an embodiment, each conduction circuit $SW_i$ corresponds to a MOS transistor, for example, with an N channel, having its drain coupled to the cathode of general light-emitting diode $D_i$ for conduction circuits $SW_1$ to $SW_N$ and to the cathode of diode $D_{OC}$ for conduction circuit $SW_{N+1}$, having its source coupled to node $A_3$, and having its gate receiving signal $S_i$. When signal $S_i$ is binary, it may take two values $S_{i,1}$ (or "0") and $S_{i,2}$ (or "1"). Transistor $SW_i$ may operate according to two states, an on state and an off state, the on state being for example obtained for value "1", and the off state being for example obtained for value "0". When signal $S_i$ can take more than two values, transistor $SW_i$ may operate according to more than two states, including an off state and at least two different conduction states. According to another embodiment, conduction circuit $SW_i$ comprises two transistors MOS, for example, with an N channel between the cathode of general light-emitting diode $D_i$ (or of diode $D_{OC}$) and node $A_3$, the transistor connected to general light-emitting diode $D_i$ (or of diode $D_{OC}$) being a cascade-assembled high-voltage transistor and the transistor connected to node $A_3$ being a low-voltage transistor controlled by signal $S_i$. This advantageously enables to increase the switching speed of conduction circuit $SW_i$.

Figure 15:
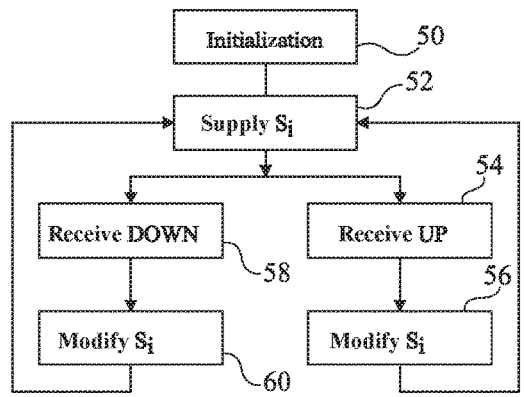
FIG. 15 shows a flowchart of the operation of an embodiment of a method of controlling the optoelectronic circuit shown in FIG. 14.

FIG. 15 shows, in the form of an operating diagram, an embodiment of a method of controlling conduction circuits $SW_i$ by means of control unit 40. The method starts at step 50.

Step 50 corresponds to an initialization step, for example on starting of optoelectronic circuit 20, that is, at the powering-on of optoelectronic circuit 20. As an example, at step 50, control unit 40 supplies signal $S_i$ at state $S_{i,1}$, that is, all conduction circuits $SW_i$ are in the state where their resistance is the strongest. When conduction circuits $SW_i$ are switches, all switches $SW_i$ are turned off at step 50. The method carries on at step 52.

At step 52, control unit 40 keeps the supply of signals $S_i$ at the last determined value as long as control unit 40 receives signals DOWN and UP at "0". At the initialization step, since no current is flowing through general light-emitting diodes $D_1$ to $D_N$, voltage $V_{CS}$ is naturally drawn to 0 V, and is thus smaller than voltage $V_{UP}$, so that signal UP switches to "1".

At step 54, control unit 40 receives a signal UP at "1". This means that voltage $V_{CS}$ has decreased below $V_{UP}$. The method carries on at step 56.

At step 56, control unit 40 modifies the values of signals $S_i$ to increase voltage $V_{CS}$. According to an embodiment, when each conduction circuit $SW_i$ corresponds to a switch and switches $SW_1$ to $SW_{i-1}$ are off and switches $SW_i$ to $SW_{N+1}$ are on, an increase of voltage $V_{CS}$ can be obtained by turning on switch $SW_{i-1}$. According to another embodiment, when each conduction circuit $SW_i$ is in a plurality of conduction states and conduction circuits $SW_1$ to $SW_{i-1}$ are in the non-conductive state, conduction circuits $SW_{i+1}$ to $SW_{N+1}$ are in the most conductive conduction state, and conduction circuit $SW_i$ is in one of the conductive states, an increase of voltage $V_{CS}$ can be obtained, in the case where the conduction state of circuit $SW_i$ is not the most conductive state, by modifying the conduction state of conduction circuit $SW_i$ to increase the conduction thereof, or, if the conduction state of circuit $SW_i$ is the most conductive state, by modifying the state of circuit $SW_{i-1}$ to set it to its less conductive conduction state.

At step 58, control unit 40 receives a signal DOWN at "1". This means that voltage $V_{CS}$ has increased above $V_{DOWN}$. The method carries on at step 60.

At step 60, control unit 40 modifies the values of signals $S_i$ to decrease voltage $V_{CS}$. According to an embodiment, when each conduction circuit $SW_i$ corresponds to a switch and switches $SW_1$ to $SW_{i-1}$ are off and switches $SW_i$ to $SW_{N+1}$ are on, a decrease in voltage $V_{CS}$ can be obtained by turning off switch $SW_i$. According to another embodiment, when each conduction circuit $SW_i$ has more than two conduction states, conduction circuits $SW_1$ to $SW_{i-1}$ are in the non-conductive state, conduction circuits $SW_{i+1}$ to $SW_{N+1}$ are in the most conductive conduction state and conduction circuit $SW_i$ is in one of the conductive states, a decrease in voltage $V_{CS}$ can be obtained by modifying the conduction state of conduction circuit $SW_i$ to decreases the conduction thereof. If conduction circuit $SW_i$ is in the non-conductive state, the state of conduction circuit $SW_{i+1}$ is modified to make the latter less conductive. The method then carries on at step 52.

A regulation of voltage $V_{CS}$, which remains between voltage thresholds $V_{UP}$ and $V_{DOWN}$ whatever the variations of $V_{RECT}$, is thus obtained.

An embodiment of the method of controlling optoelectronic circuit 20 will now be described in the case where conduction circuits $SW_i$ correspond to switches. At the beginning of a rising phase of voltage $V_{RECT}$, that is, in the case where voltage $V_{RECT}$ is obtained from a sinusoidal voltage $V_{IN}$, when $V_{RECT}$ increases from 0 V, switches $SW_i$, with i varying from 1 to N, are on, that is, electrically conductive.

In a rising phase of power supply voltage $V_{RECT}$, for i varying from 1 to N, while general light-emitting diodes $D_1$ to $D_{i-1}$ are conductive and general light-emitting diodes $D_i$ to $D_N$ are non-conductive, when the voltage across general light-emitting diode $D_i$ becomes greater than the threshold voltage of general light-emitting diode $D_i$, the latter becomes conductive and a current starts flowing through general light-emitting diode $D_i$. This results in an increase of voltage $V_{CS}$. If the latter rises above threshold voltage $V_{DOWN}$, unit 40 then causes the turning-off of the switch which has the lowest index among the on switches.

At the beginning of a rising phase of power supply voltage $V_{RECT}$, that is, in the case where voltage $V_{RECT}$ is obtained from a sinusoidal voltage $V_{IN}$, when $V_{RECT}$ decreases from a maximum positive voltage, greater than the sum of the threshold voltages of light-emitting diodes $D_1$ to $D_N$, switches $SW_i$, with i varying from 1 to N, are off. In a falling phase, general light-emitting diodes $D_1$ to $D_i$ being conductive and general light-emitting diodes $D_{i+1}$ to $D_N$ being non-conductive, when voltage $V_{CS}$ decreases below voltage $V_{UP}$, this means that the voltage across current source 30 risks being too low for the latter to operate properly and to deliver its nominal current. This thus means that number i of conductive diodes should be decreased to increase the voltage across current source 30. Unit 40 then causes the turning-on of the switch of highest index among the off switches. In the case where each switch $SW_i$ is made of an N-channel MOS transistor having its drain coupled to the cathode of general light-emitting diode $D_i$ and having its source coupled to node $A_3$, when power supply voltage $V_{RECT}$ decreases, the voltage between the drain of switch $SW_i$ and node $A_3$ decreases until the operation of transistor $SW_i$ switches from the saturation state to the linear state. This causes an increase of the voltage between the gate and the source of transistor $SW_i$ and thus in a decrease of voltage $V_{CS}$.

Advantageously, the embodiment of the previously-described method of controlling switches $SW_i$ does not depend on the number of elementary light-emitting diodes which form each general light-emitting diode $D_i$ and thus does not depend on the threshold voltage of each general light-emitting diode.

An embodiment of the optoelectronic circuit control method will now be described in the case where each conduction circuit $SW_i$ has a number of conduction states greater than or equal to 3. At the beginning of a rising phase of voltage $V_{RECT}$, that is, in the case where voltage $V_{RECT}$ is obtained from a sinusoidal voltage $V_{IN}$, when $V_{RECT}$ increases from 0 V, conduction circuits $SW_i$, with i varying from 1 to N+1, are in the most conductive conduction state. In a rising phase of power supply voltage $V_{RECT}$, for i varying from 1 to N, while general light-emitting diodes $D_1$ to $D_{i-1}$ are conductive and general light-emitting diodes $D_i$ to $D_N$ are non-conductive, when the voltage across general light-emitting diode $D_i$ becomes greater than the threshold voltage of general light-emitting diode $D_i$, the latter becomes conductive and a current starts flowing through general light-emitting diode $D_i$. This results in an increase of voltage $V_{CS}$. If the latter rises above voltage threshold $V_{DOWN}$, unit 40 then orders the switching of the conduction circuit having the lowest index among the conductive conduction circuits to a less and less conductive state each time voltage $V_{CS}$ increases beyond voltage $V_{DOWN}$ and this, until it reaches the non-conductive state.

At the beginning of a rising phase of power supply voltage $V_{RECT}$, that is, in the case where voltage $V_{RECT}$ is obtained from a sinusoidal voltage $V_{IN}$, when $V_{RECT}$ decreases from a maximum positive voltage, greater than the sum of the threshold voltages of light-emitting diodes $D_1$ to $D_N$, conduction circuits $SW_i$, with i varying from 1 to N−1, are in the non-conductive state. In a falling phase, general light-emitting diodes $D_i$ to $D_{i-1}$ being conductive and general light-emitting diodes $D_i$ to $D_N$ being non-conductive, when voltage $V_{CS}$ decreases below threshold voltage $V_{UP}$, unit 40 then orders the switching of the conduction circuit having the highest index among the conduction circuits which are not in the most conductive state to a more and more conductive state each time voltage $V_{CS}$ decreases below voltage threshold $V_{UP}$ and this, until the most conductive state has been reached.

Figure 16:
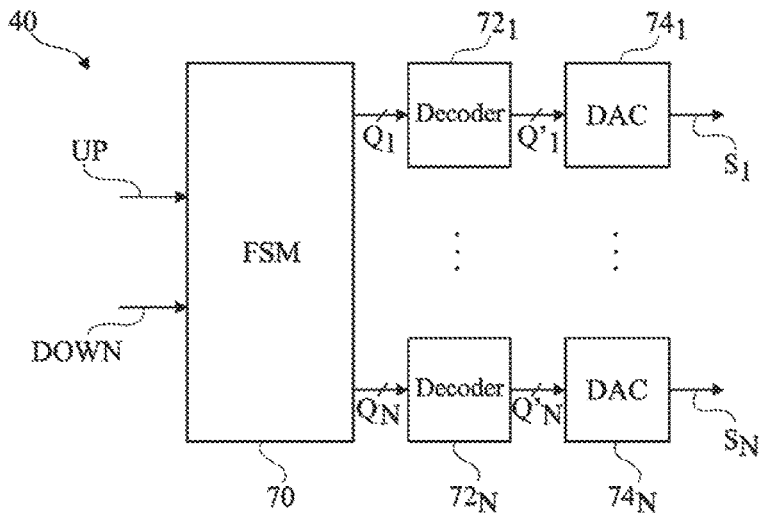
FIG. 16 shows a more detailed embodiment of an element of the optoelectronic circuit shown in FIG. 14.

FIG. 16 shows a more detailed embodiment of control unit 40 in the case where number K of conduction states of each conduction circuit $SW_i$ is greater than or equal to 3. In the present embodiment, control unit 40 comprises a finite state machine 70 (FSM), also called finite state automaton, with K*(N+1) states receiving signals DOWN and UP and supplying a digital signal $Q_i$ for each conduction circuit $SW_i$. As an example, finite automaton 70 can operate on edges of UP and DOWN. Each value of digital signal $Q_i$ codes one of the K states of conduction circuit $SW_i$. Control unit 40 further comprises a decoder $72_i$ for each conduction circuit $SW_i$, with i varying from 1 to (N+1), each decoder $72_i$ receiving digital signal $Q_i$ and supplying a digital signal $Q'_i$. Control unit 40 further comprises a digital-to-analog converter $74_i$ (DAC) for each conduction circuit $SW_i$, with i varying from 1 to N+1, for example, of pulse-width modulation type, or a network which divides a voltage into a plurality of intermediate voltages, each digital-to-analog converter $74_i$ receiving digital signal $Q'_i$ and supplying signal $S_i$. Decoder $72_i$ enables to supply a digital signal $Q'_i$ adapted to the operation of the associated digital-to-analog converter $74_i$. The number of bits of digital signals $Q_i$ and $Q'_i$ depends on the type of coding used and on the accuracy of digital-to-analog converter $74_i$.

In the case where number K of conduction states is equal to 2, the embodiment of control unit 40 shown in FIG. 16 may be simplified, by not including in control unit 40 decoders $72_i$ and by replacing digital-to-analog converter $74_i$ with a level adjustment circuit.

According to an embodiment, finite automaton 70 uses a counter COMPT comprising (N+1)*(K−1) bits and equal to the concatenation of signals $Q_1$ to $Q_{N+1}$ and each digital signal $Q_i$ comprises (K−1) bits. On initialization of the optoelectronic circuit, all the counter bits are set to "0". In operation, finite automaton 70 increments counter COMPT when it receives a signal UP at "1"; if all bits are set to "1", the counter remains in its state. Finite automaton 70 decrements counter COMPT when it receives a signal DOWN at "1"; if all bits are set to "0", the counter remains in its state.

Advantageously, the maximum voltages applied to the electronic components, particularly transistors MOS, of comparators 42, 40 remain small as compared with the maximum value that voltage $V_{RECT}$ can take. It is then not necessary to provide, for comparators 42, 40, electronic components capable of withstanding the maximum voltage that voltage $V_{RECT}$ can take.

According to another embodiment, as soon as the voltage at the drain of switch $SW_N$ becomes insufficient to have the maximum current flow through general light-emitting diode $D_N$, switch $SW_N$ is in its most conductive state, node $A_3$ has the same potential as node $A_2$, and no current is flowing. A detection of this most conductive state of switch $SW_N$ enables to achieve a filtered feedback (for example, of low-pass type) on the value of the current flowing through general light-emitting diode $D_N$ until switch $SW_N$ no longer is in its most conductive state for one full period of voltage $V_{RECT}$ and thus node $A_3$ no longer is at potential $A_2$ and current source 14 is operative. The current in the general light-emitting diodes will reach the value for which the general light-emitting diodes will be constantly on all along a period of $V_{RECT}$. There thus is a regulation of the current in the general light-emitting diodes according to voltage $V_{RECT}$.

Figure 17:
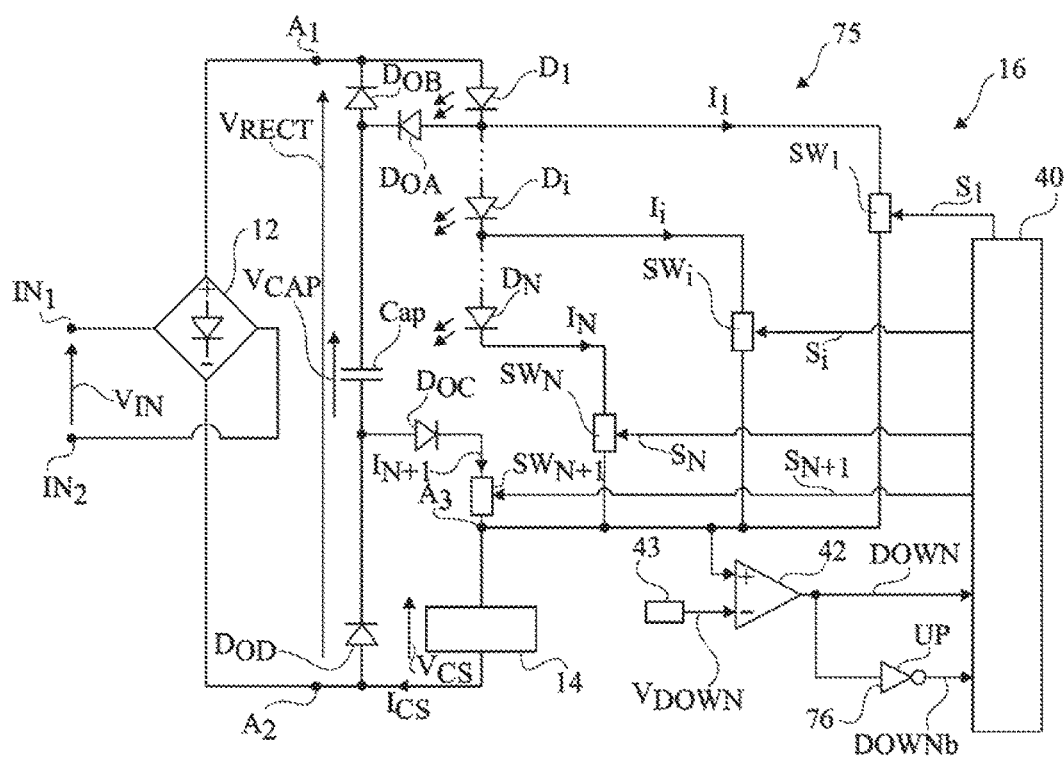
FIG. 17 shows an electric diagram of another embodiment of an optoelectronic circuit comprising light-emitting diodes.

FIG. 17 shows an electric diagram of another embodiment of an optoelectronic circuit 75 comprising all the elements of optoelectronic circuit 20 except for comparator 44 and for circuit 45 for supplying voltage threshold $V_{UP}$, which are not present. Optoelectronic circuit 75 further comprises an inverter 76 receiving signal DOWN and supplying to control unit 40 signal DOWNb, which is the complementary of signal DOWN. Signal DOWNb is equivalent to signal UP previously described for optoelectronic circuit 20 and may be supplied to the input of control unit 40 which, for optoelectronic circuit 20, receives signal UP. Control unit 40 may have the structure previously described in relation with FIG. 16. In particular, control unit 40 may comprise a finite state automaton 70 operating as previously described in relation with FIG. 16. As a variation, comparator 42 may be a hysteresis comparator. According to another embodiment, comparator 42 of optoelectronic circuit 75 is replaced with a Schmitt trigger, having two intrinsic threshold voltages $V_L$ and $V_H$, receiving voltage $V_{CS}$ and supplying signal DOWN. As an example, when voltage $V_{CS}$ increases from 0 V, signal DOWN remains at state "0" until voltage $V_{CS}$ exceeds voltage threshold $V_H$. At this time, signal DOWN switches to state "1". Signal DOWN remains at state "1" until the time when voltage $V_{CS}$ becomes lower than voltage threshold $V_L$. At this time, signal DOWN switches to state "0". Signal DOWN remains at state "0" until voltage $V_{CS}$ rises back above voltage threshold $V_H$.

To modify the light power supplied by the illumination circuit, it is known to place a dimmer between the source of the rectified voltage and the optoelectronic circuit. There exist several types of dimmers, particularly leading edge dimmers and trailing edge dimmers.

Figure 18:
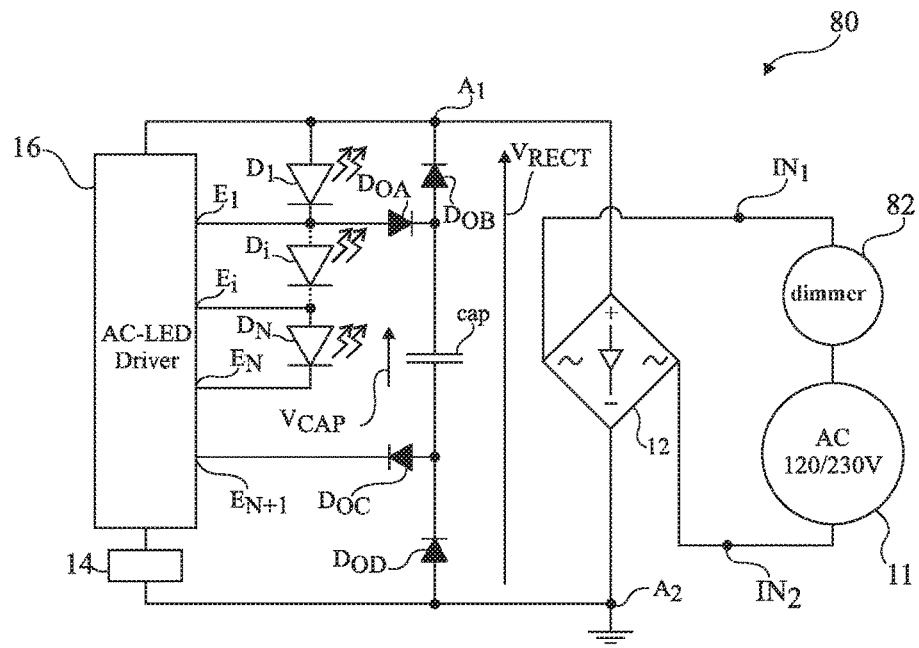
FIG. 18 shows an electric diagram of the optoelectronic circuit shown in FIG. 3 and equipped with a dimmer.

FIG. 18 is a view similar to FIG. 3 of an embodiment of an optoelectronic circuit 80 where a dimmer 82 is arranged in series with source 11 between terminals $IN_1$ and $IN_2$. Dimmer 82 may be a phase cut dimmer comprising an electronic switch having a conduction time limited to a fraction of period T of voltage $V_{IN}$.

A disadvantage is that dimmers have generally been designed to operate with incandescent lamp illumination circuits and may not operate properly when they are connected to an optoelectronic circuit comprising light-emitting diodes, since their power is often too low as compared with the minimum power required by the dimmer.

Figure 19:
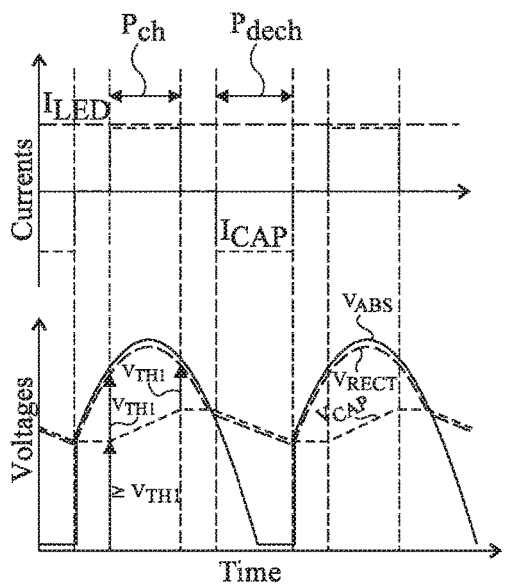
FIGS. 19 and 20 are timing diagrams of currents and of voltages of the optoelectronic circuit of FIG. 18 for two values of the dimmer firing angle.
Figure 20:
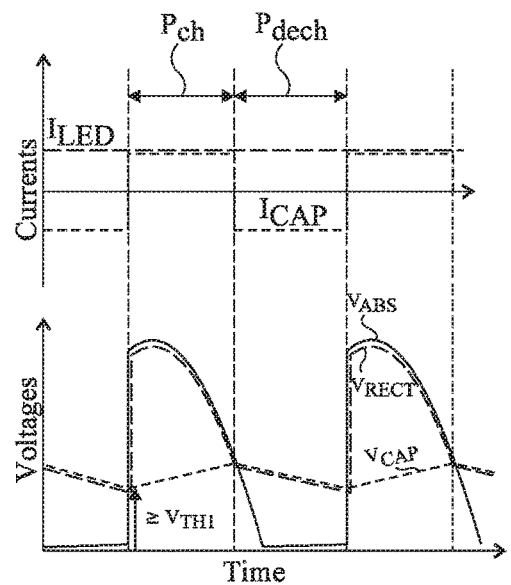

FIGS. 19 and 20 each show an example of curves of the variation of currents $I_{LED}$ and $I_{CAP}$ and of voltages $V_{ABS}$, $V_{RECT}$, and $V_{CAP}$ when AC voltage $V_{IN}$ is sinusoidal with a period T and when dimmer 82 is a leading edge dimmer. Voltage $V_{ABS}$ follows the signal which would be obtained in the absence of a dimmer, except for a duration T' at the beginning of each sinusoid arc, during which voltage $V_{ABS}$ is substantially zero. For a trailing edge dimmer, voltage $V_{ABS}$ follows the signal which would be obtained in the absence of a dimmer except for a duration at the end of each sine wave arc during which voltage $V_{ABS}$ is substantially zero. The ratio of duration T' to half period T of the non-rectified sinusoidal signal is called the firing angle of the dimmer.

To be sure that there is no turning off of general light-emitting diode $D_1$, the charge of capacitor Cap must always be greater than threshold voltage $V_{TH1}$. If the voltage is chopped by dimmer 82, capacitor Cap has less time to recharge while the discharge time in general light-emitting diode $D_1$ is lengthened.

FIG. 19 shows a configuration where the current flowing through light-emitting diode $D_1$ is not modified by the presence of dimmer 82 while FIG. 20 shows a configuration with a larger firing angle where the current flowing through light-emitting diode $D_1$ decreases due to the presence of dimmer 82.

Two considerations should be taken into account to allow the use of a dimmer 82 while maintaining a tolerable blink/flicker level:

first, a tolerable luminosity variation level should be ensured during a period of $V_{RECT}$; and second, the operation of dimmer 82 should be ensured by imposing an impedance there across similar to that for which it has been designed, that is, a generally low impedance.

For the first consideration, to be sure that there is no turning off of general light-emitting diode $D_1$, the charge of capacitor Cap must always be greater than threshold voltage $V_{TH1}$. Now, if mains voltage $V_{IN}$ is chopped by dimmer 82, capacitor Cap has less time to recharge while the discharge time in general light-emitting diode $D_1$ is lengthened. To keep an acceptable charge level and avoid the luminosity variation by turning off of general light-emitting diode $D_1$, an embodiment provides modulating, particularly decreasing, the charge and discharge currents in capacitor Cap so that the average voltage across capacitor Cap is always sufficient to keep at least general light-emitting diode $D_1$ on and thus limit luminosity variations during a period of $V_{RECT}$.

For the second consideration, the problem is posed when voltage $V_{RECT}$ is lower than voltage $V_{CAP}$, since the current in the light-emitting diodes is drawn from capacitor Cap and not from source 11. An embodiment provides adding a device enabling to detect whether the current is drawn from the mains and to compensate for its absence or its too low value with an additional current.

Figure 21:
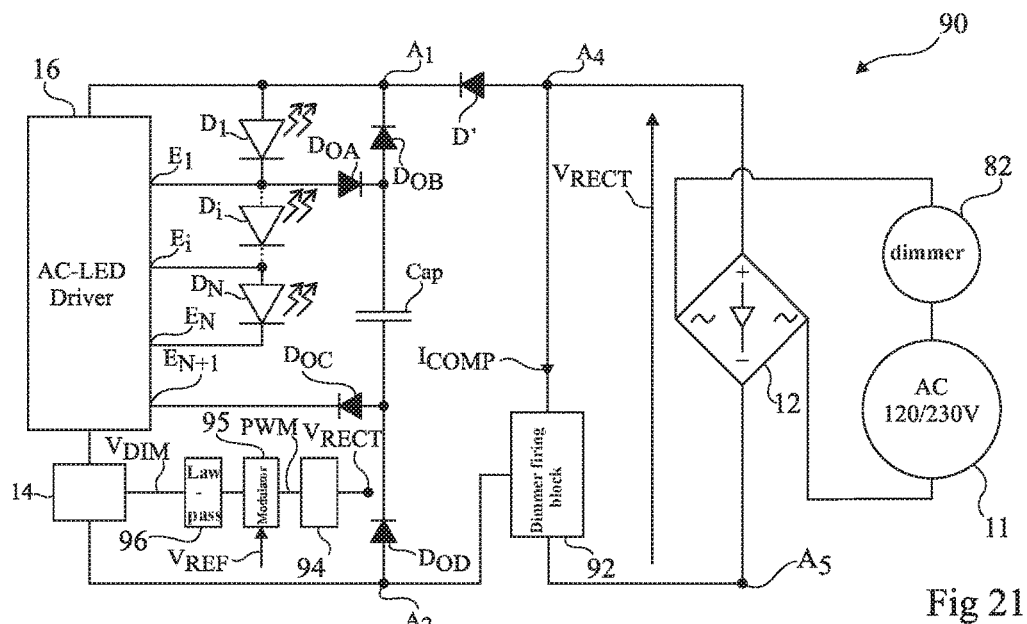
FIGS. 21 and 22 show electric diagrams of embodiments of an optoelectronic circuit capable of operating with a dimmer.
Figure 22:
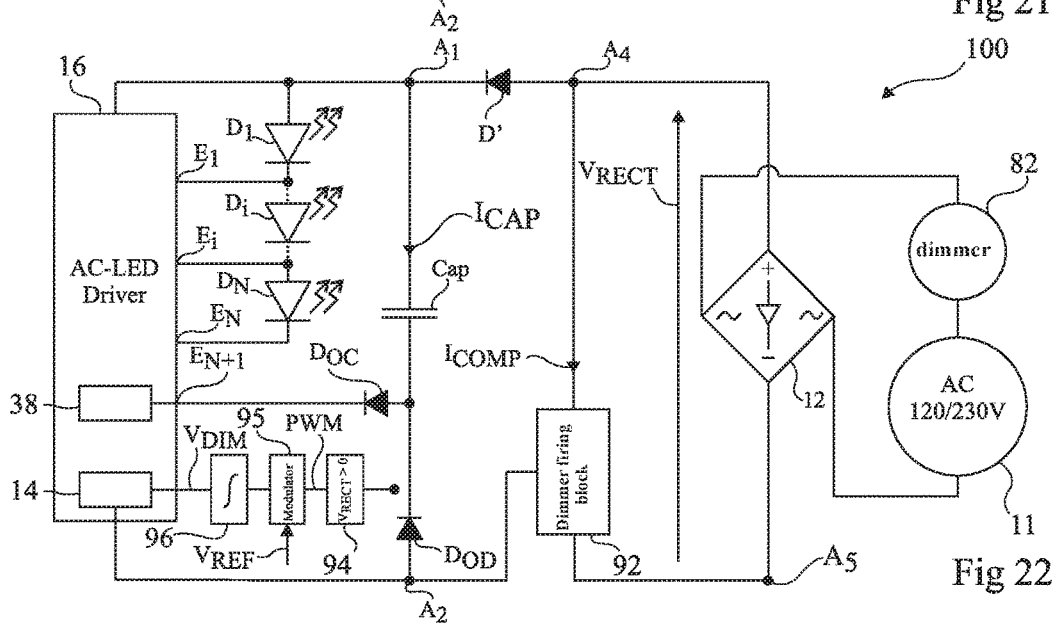

FIGS. 21 and 22 show embodiments of optoelectronic circuits 90 and 100 adapted to the use of a dimmer 82. Optoelectronic circuit 90 comprises all the elements of optoelectronic circuit 20 shown in FIG. 3 while optoelectronic circuit 100 comprises all the elements of optoelectronic circuit 20 shown in FIG. 11. Each circuit 90 and 100 further comprises a diode D' having its cathode connected to node $A_1$ and having its anode connected to a node $A_4$, connected to an output terminal of rectifying bridge 12. Call $A_5$ a node connected to the other output terminal of rectifying bridge 12. Each optoelectronic circuit 90 and 100 further comprises a unit 92 (dimmer firing block) enabling to start the operation of dimmer 82. Unit 92 is assembled in parallel with rectifying bridge 12, between node $A_4$ and node $A_5$. The potential at node $A_5$ may correspond to the low reference potential of rectifying bridge 12. Unit 92 is, further, coupled to the anode of diode $D_{OD}$.

In the present embodiment, current source 14 is a current source controllable by a signal $V_{DIM}$. As an example, the intensity of the current supplied by current source 14 is proportional to signal $V_{DIM}$. According to an embodiment, signal $V_{DIM}$ is a voltage which is obtained from voltage $V_{RECT}$, measured between nodes $A_4$ and $A_5$. According to an embodiment, each circuit 90 and 100 comprises a threshold detection unit 94 which receives voltage $V_{RECT}$ and which is capable of supplying a pulse-width modulated binary signal PWM having its frequency corresponding to the frequency of signal $V_{RECT}$ and having its duty cycle determined by comparing voltage $V_{RECT}$ with at least one threshold. Circuit 90 further comprises a modulator 95 with a reference voltage $V_{REF}$ receiving signal PWM and supplying a modulated signal PWM', a filter 96 receiving modulated signal PWM' and supplying filtered signal $V_{DIM}$. Modulator 95 enables to adapt the average value of signal $V_{DIM}$ according to voltage $V_{REF}$ and to the duty cycle of signal PWM.

Figure 23:
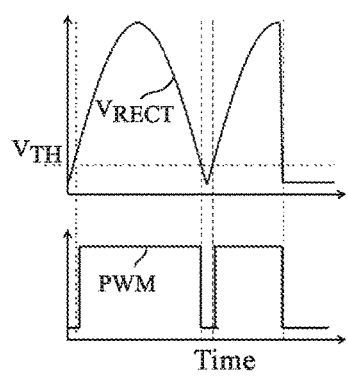
FIG. 23 is a timing diagram of voltages of an embodiment of a unit of the optoelectronic circuit of FIG. 21 or 22.

FIG. 23 shows a timing diagram of voltage $V_{RECT}$ and of voltage PWM in the case where unit 94 compares voltage $V_{RECT}$ with a single threshold $V_{TH}$. Signal PWM is at '1' when voltage $V_{RECT}$ is greater than or equal to threshold $V_{TH}$ and signal PWM is at '0' when voltage $V_{RECT}$ is smaller than threshold $V_{TH}$.

Figure 24:
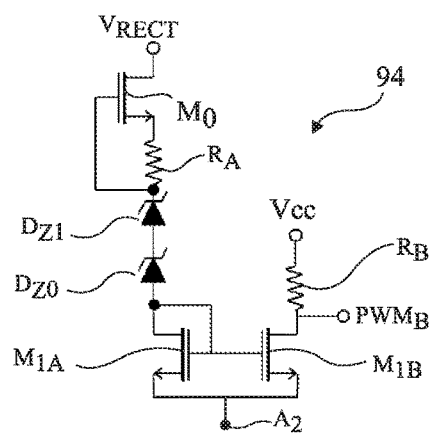
FIG. 24 shows an electric diagram of an embodiment of a unit of the optoelectronic circuit of FIG. 21 or 22 supplying the signals of the timing diagram of FIG. 23.

FIG. 24 shows an embodiment of unit 94 enabling to obtain the timing diagram shown in FIG. 23. Unit 94 comprises an N-channel MOS transistor M0 having its drain receiving voltage $V_{RECT}$, having its source coupled to a terminal of a resistor $R_4$, and having its gate coupled to the other terminal of resistor $R_4$. Two Zener diodes $D_{Z0}$ and $D_{Z1}$ are series-assembled between resistor $R_4$ and a current mirror, the cathodes of diodes $D_{Z0}$ and $D_{Z1}$ being directed towards resistor $R_4$. The current mirror comprises two N-channel MOS transistors $M_{1A}$ and $M_{1B}$. Transistor $M_{1A}$ is diode-assembled. The sources of transistors $M_{1A}$ and $M_{1B}$ are coupled to node $A_2$. The drain of transistor $M_{1A}$ is coupled to the gates of transistors $M_{1A}$ and $M_{1B}$ and to the anode of Zener diode $D_{Z0}$. The drain of transistor $M_{1B}$ supplies signal $PWM_B$, which is the complementary of signal PWM, and is coupled to a source of a high reference potential VCC by a resistor $R_4$. High reference potential VCC may be obtained from voltage $V_{RECT}$. Call $V_{DZ0}$ the voltage between the cathode and the anode of Zener diode $D_{Z0}$, $V_{DZ1}$ the voltage between the cathode and the anode of Zener diode $D_{Z1}$, and $V_{THM1}$ the threshold voltage of transistors $M_{1A}$ and $M_{1B}$.

Transistor $M_0$ is a depleted transistor, that is, with a negative threshold voltage $V_T$. When voltage $V_{RECT}$ is greater than the sum of voltages $V_{DZ0}$, $V_{DZ1}$, and $V_{THM1}$, a current flows through transistor $M_{1A}$ and is copied in transistor $M_{1B}$. Signal $PWM_B$ is then in the low state, pulled to the low reference potential by transistor $M_{1B}$. If voltage $V_{RECT}$ is smaller than the sum of voltages $V_{DZ0}$, $V_{DZ1}$, and $V_{THM1}$, no current flows through transistor $M_{1B}$. Signal $PWM_B$ is then in the high state, pulled to high reference potential $V_{CC}$ by resistor $R_B$. Threshold voltage $V_{TH}$ of unit 94 is determined by the threshold voltages of Zener diodes $D_{Z0}$ and $D_{Z1}$ and threshold voltage $V_{THM1}$ of transistor $M_{1A}$.

According to another example, unit 94 compares voltage $V_{RECT}$ with two thresholds according to a hysteresis cycle.

Figure 25:
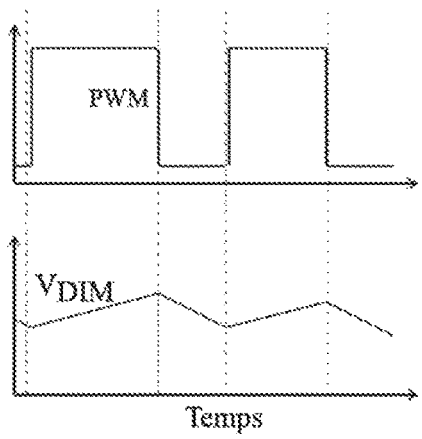
FIG. 25 is a timing diagram of voltages of an embodiment of a unit of the optoelectronic circuit of FIG. 21 or 22.

FIG. 25 shows a timing diagram of voltage $V_{DIM}$ and of voltage PWM.

Figure 26:
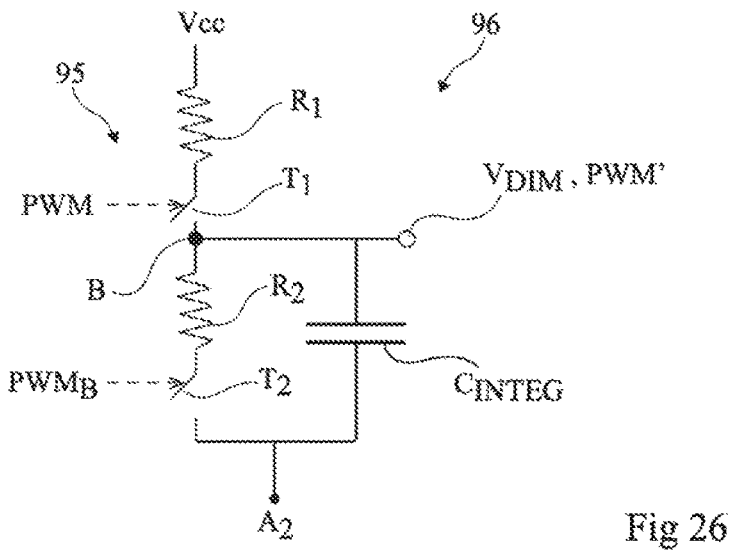
FIG. 26 shows an electric diagram of an embodiment of a unit of the optoelectronic circuit of FIG. 21 or 22 supplying the signals of the timing diagram of FIG. 25.

FIG. 26 is an electric diagram of an embodiment of modulation unit 95 where voltage $V_{REF}$ corresponds to high reference potential VCC and of integration unit 96 enabling to obtain the signals of the timing diagram shown in FIG. 25. In this embodiment, voltages $V_{DIM}$ and PWM' are confounded.

According to an embodiment, modulation and integration units 95 and 96 comprise a resistor $R_1$ and a switch $T_1$ in series between the source of high reference potential $V_{CC}$ and a node B. Switch $T_1$ is controlled by signal PWM. Modulation and integration units 95 and 96 further comprise a resistor $R_2$ and a switch $T_2$ in series between node B and node $A_2$. Switch $T_2$ is controlled by signal $PWM_B$. Integration unit 96 further comprises a capacitor $C_{INTEG}$ assembled between node B and node $A_2$. Voltage $V_{DIM}$ corresponds to the voltage across capacitor $C_{INTEG}$.

The ratio of resistors $R_1$ and $R_2$ enables to set the modulation rate and thus the average value of modulated and filtered signal $V_{DIM}$.

Figure 27:
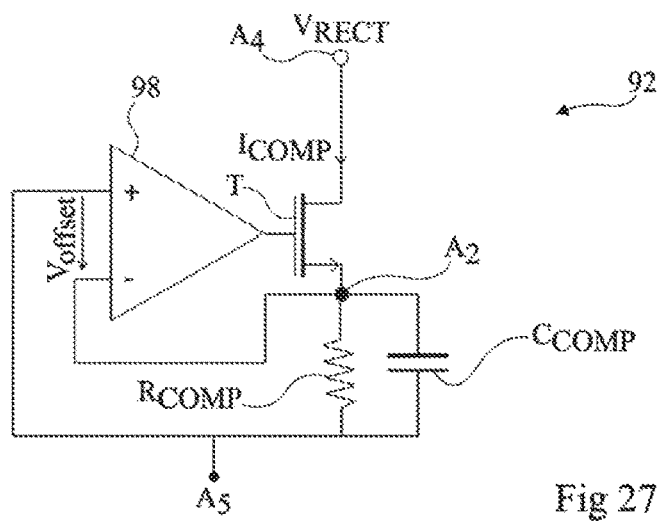
FIG. 27 shows an electric diagram of another embodiment of a unit of the optoelectronic circuit of FIG. 21 or 22.

FIG. 27 is an electric diagram of an embodiment of unit 92. Unit 92 comprises a MOS transistor T, for example, with an N channel, having its source connected to node $A_2$ and having its drain connected to node $A_4$. Unit 92 further comprises a capacitor $C_{COMP}$ and a resistor $R_{COMP}$ in parallel arranged between node $A_2$ and node $A_5$. Unit 92 further comprises a differential amplifier 98 having its non-inverting input (+) connected to node $A_5$, having its inverting input (−) connected to node $A_2$, and having its output controlling the gate of transistor T. Voltage $V_{offset}$ is the voltage between the (+) and (−) inputs of amplifier 98. Current $I_{COMP}$ is the current at the drain of transistor T.

Unit 92 enables to draw a minimum current from the mains by placing a resistor $R_{COMP}$ between the ground of switching circuit 16 (potential GNDA at node $A_2$) and the ground of rectifying bridge 12 (potential GND at node $A_5$). Thus, if no current is drawn from the mains by switching circuit 16, a current $I_{COMP}$ of value $V_{offset}/R_{COMP}$ is drawn from the mains. A current peak $I_{COMP}$ enables to prime dimmer 82 by charging capacitor $C_{COMP}$ at the beginning of a leading edge on voltage $V_{RECT}$. A constant current $I_{COMP}$ in resistor $R_{COMP}$ enables to hold the state of the dimmer by drawing a hold current Tamp, adjustable by means of resistor $R_{COMP}$. When the mains powers the light-emitting diodes, a current at least equal to $V_{offset}/R_{COMP}$ is drawn from the mains.

Specific embodiments have been described. Various alterations and modifications will occur to those skilled in the art. Although detailed embodiments have been described, which comprise a signal capacitor Cap, one or a plurality of additional capacitors may be provided. For example, an additional capacitor may be added in parallel with an assembly of successive general light-emitting diodes. Further, although detailed embodiments have been described, where the least electrically conductive conduction state of each conduction circuit $SW_i$ corresponds to a non-conductive state, it should be clear that these embodiments may also be implemented with a conduction circuit $SW_i$ for which the least electrically conductive state however corresponds to a state where current flows through circuit $SW_i$, for example, a current having an intensity smaller than or equal to the theoretical limit, which is the maximum intensity inducing power in conduction circuit $SW_i$ capable of being dissipated without causing a malfunction thereof. Further, although in the previously-described embodiments, switches $SW_1$ to $SW_N$ are coupled to a single current source, it should be clear that a plurality of current sources may be provided. As an example, one current source may be provided per switch $SW_i$ or one current source may be provided per pair of switches $SW_i$, etc.

What is claimed is:

1. An optoelectronic circuit intended to receive, between a first node and a second node, a variable voltage containing an alternation of rising positive phases and of falling positive phases, the optoelectronic circuit comprising:
   a plurality of light-emitting diodes series-assembled between the first node and a third node;
   a first current limitation/regulation circuit assembled between the third node and the second node;
   a switching circuit coupling the third node to at least certain light-emitting diodes of the plurality of light-emitting diodes;
   a capacitor comprising first and second plates, the first plate being connected to the first node;
   a first diode having its cathode connected to the second plate and having its anode coupled to the second node; and
   a second diode having its anode connected to the second plate and having its cathode coupled to a second current limitation/regulation circuit.

2. The optoelectronic circuit of claim 1, wherein the switching circuit comprises, for each light-emitting diode from among the light-emitting diodes coupled to the switching circuit, a current conduction circuit coupling the third node to the cathode of the light-emitting diode and capable of taking at least first and second states, the conduction circuit in the first state being less electrically conductive than in the second state.

3. The optoelectronic circuit of claim 2, wherein the switching circuit further comprises an additional current conduction circuit coupling the third node to the cathode of the second diode.

4. The optoelectronic circuit of claim 1, wherein the first current limitation/regulation circuit comprises a first current source capable of supplying a current having its intensity depending on a set point.

5. The optoelectronic circuit of claim 4, comprising a first circuit capable of receiving said variable voltage and of supplying a pulse-width modulated binary signal.

6. The optoelectronic circuit of claim 5, comprising a modulation and filtering circuit capable of receiving the binary signal and of supplying the set point having its average value depending on the duty cycle of the binary signal.

7. The optoelectronic circuit of claim 1, further comprising a device for decreasing the impedance seen between the first node and the second node.

8. The optoelectronic circuit of claim 7, wherein the impedance decrease device comprises a third current limitation/regulation circuit and a transistor in series with the third current limitation/regulation circuit.

9. The optoelectronic circuit of claim 8, wherein the impedance decrease device comprises a unit capable of controlling the transistor from the voltage across the third current limitation/regulation circuit.

* * * * *